(12) United States Patent
Hendrix et al.

(10) Patent No.: US 7,801,311 B2
(45) Date of Patent: Sep. 21, 2010

(54) RADIO RECEIVER WITH STEREO DECODER AND METHOD FOR USE THEREWITH

(75) Inventors: Jon David Hendrix, Wimberley, TX (US); Thomas Glen Ragan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1406 days.

(21) Appl. No.: 11/227,357

(22) Filed: Sep. 15, 2005

(65) Prior Publication Data

US 2007/0058817 A1  Mar. 15, 2007

(51) Int. Cl.
*H04H 20/47* (2008.01)
*H04H 20/48* (2008.01)
*H04R 5/00* (2006.01)

(52) U.S. Cl. ............... 381/2; 381/22; 381/3; 455/226.1; 455/226.2

(58) Field of Classification Search ............ 381/2, 381/22, 3; 455/226.1, 226.2
See application file for complete search history.

(56) References Cited

U.S. PATENT DOCUMENTS 6,298,361 B1 * 10/2001 Suzuki .................. 708/313
2001/0008430 A1 * 7/2001 Carr et al. ................ 348/725
2004/0096014 A1   5/2004 Hendrix et al.
2005/0036627 A1 * 2/2005 Venkatesan et al. ........... 381/2
2005/0100178 A1 * 5/2005 Rybicki et al. ............ 381/101
2005/0185810 A1 * 8/2005 Yamada et al. ............ 381/309

* cited by examiner

*Primary Examiner*—Vivian Chin
*Assistant Examiner*—Paul Kim
(74) *Attorney, Agent, or Firm*—Gary R. Stanford

(57) ABSTRACT

A stereo decoder includes a first digital filter for producing a first filtered composite audio signal and a second digital filter for producing a second filtered composite audio signal. A sum/difference network produces a left channel signal and a right channel signal. A processor executes operational instructions that calculate a first corner frequency of a first digital filter based on a signal quality of the FM signal, calculate a first set of filter coefficients for the first digital filter based on the first corner frequency and an approximation of a filter transform, calculate a second corner frequency of a second digital filter based on the signal quality, and calculate a second set of filter coefficients for the second digital filter, based on the second corner frequency and the approximation of the filter transform.

38 Claims, 10 Drawing Sheets

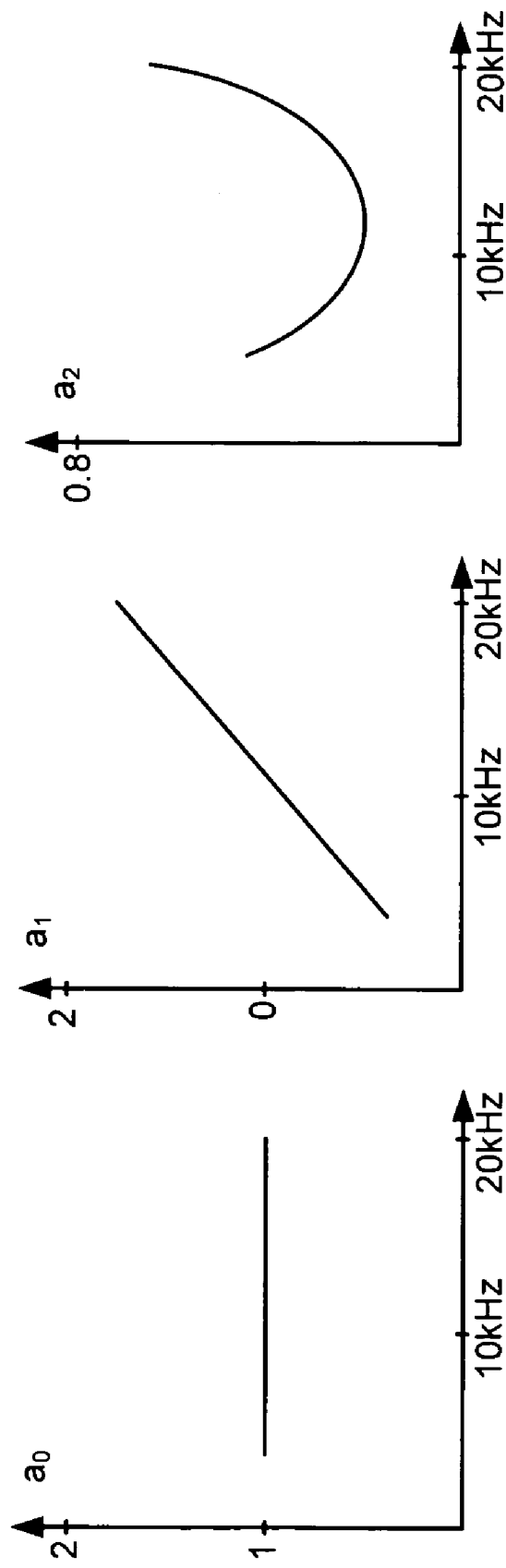

U S 7,801,311 B2

RADIO RECEIVER WITH STEREO DECODER AND METHOD FOR USE THEREWITH

TECHNICAL FIELD OF THE INVENTION

The present invention relates to stereo decoders as may be used in radio receivers, and related methods.

DESCRIPTION OF RELATED ART

As is known, integrated circuits are used in a wide variety of electronic equipment, including portable, or handheld, devices. Such handheld devices include personal digital assistants (PDA), CD players, MP3 players, DVD players, AM/FM radio, a pager, cellular telephones, computer memory extension (commonly referred to as a thumb drive), etc. Each of these handheld devices includes one or more integrated circuits to provide the functionality of the device.

As an example, a handheld FM radio receiver may include multiple integrated circuits to support the reception and processing of broadcast radio signals in order to produce an audio output that is delivered to the user through speakers, headphones or the like. Both analog and digital implementations are possible for many of the circuit components used to process these signals. In the presence of weak input signals, the signal to noise ratio decreases and the quality of audio signal can degrade. It is desirable to adapt the audio filter characteristics to compensate for these weak signals. In digital implementations, the variation of these filter characteristics can involve complex computations that require additional processing speed and power.

The need exists for a radio receiver that can be implemented efficiently on an integrated circuit, and that can compensate for the presence of weak RF signals on the input.

BRIEF SUMMARY OF THE INVENTION

A stereo decoding system for use in a radio receiver that receives a radio signal according to one embodiment includes first and second digital filters, a sum/difference network, and a processor. The first digital filter is operably coupled to a first composite audio channel for producing a first filtered composite audio signal and has a first set of filter coefficients. The second digital filter is operably coupled to a second composite audio channel for producing a second filtered composite audio signal and has a second set of filter coefficients. The sum/difference network is operably coupled to the first filtered composite audio signal and the second filtered composite audio signal for producing a left channel signal and a right channel signal. The processor is operably coupled to the first digital filter and the second digital filter and executes operational instructions. The instructions calculate a first corner frequency of a first digital filter based on a signal quality of the received radio signal, calculate a first set of filter coefficients for the first digital filter based on the first corner frequency and an approximation of a filter transform, store the first set of filter coefficients in the first digital filter, calculate a second corner frequency of a second digital filter based on the signal quality, calculate a second set of filter coefficients for the second digital filter, based on the second corner frequency and the approximation of the filter transform, and store the second set of filter coefficients in the second digital filter.

A method for use in a radio receiver for receiving a radio signal according to one embodiment includes measuring a signal quality of the radio signal, calculating a first corner frequency of a first digital filter based on the signal quality, calculating a first set of filter coefficients for the first digital filter based on the first corner frequency and an approximation of a filter transform, calculating a second corner frequency of a second digital filter based on the signal quality, calculating a second set of filter coefficients for the second digital filter based on the second corner frequency and the approximation of the filter transform, filtering a first audio channel of the radio signal using the first digital filter, and filtering the second audio channel of the radio signal using the second digital filter.

BRIEF DESCRIPTION OF THE SEVERAL VIEWS OF THE DRAWINGS

FIGS. 5-10 present graphical representations of second order digital lowpass filter coefficients calculated as a function of corner frequency;

DETAILED DESCRIPTION OF THE INVENTION INCLUDING THE PRESENTLY PREFERRED EMBODIMENTS

Figure 1:
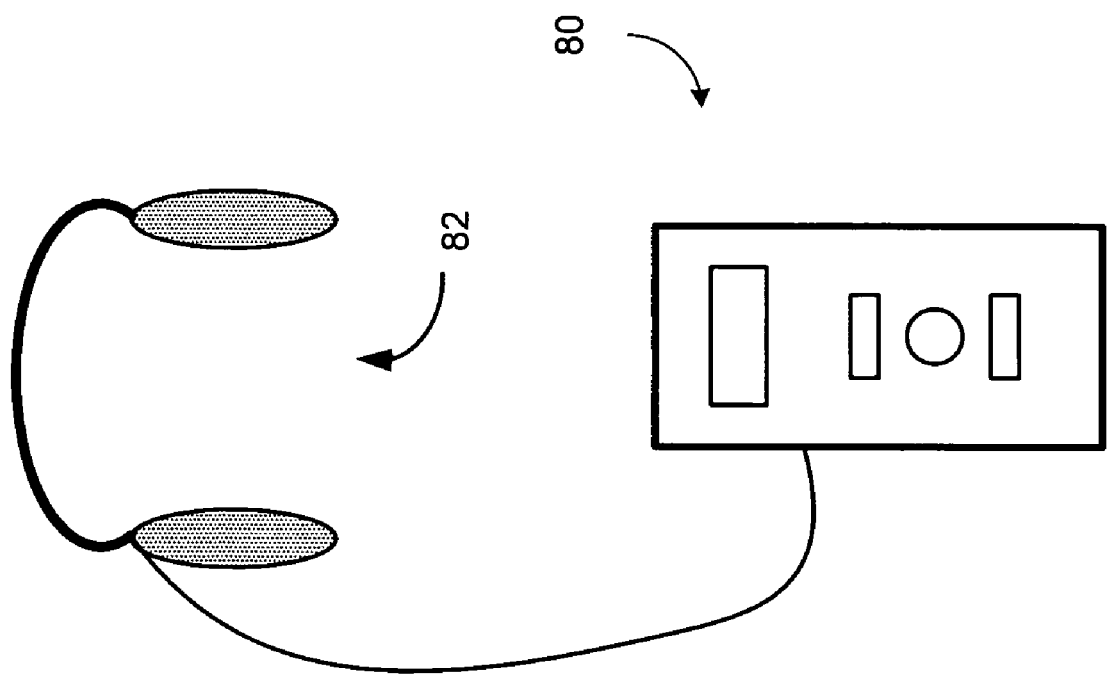
FIG. 1 presents a pictorial diagram of a handheld audio system in accordance with an embodiment of the present invention.

FIG. 1 presents a pictorial diagram of a handheld audio system in accordance with an embodiment of the present invention. In particular, a handheld audio system 80 is shown that receives a radio signal that carries at least one composite audio channel that includes right and left channel stereo audio signals. In operation, the handheld audio system 80 produces an audio output for a user by means of headphones 82 or other speaker systems. In addition to producing an audio output from the received radio signal, the handheld audio system 80 can optionally process stored MP3 files, stored WMA files, and/or other stored digital audio files to produce an audio output for the user. Handheld audio system 80 includes one or more integrated circuits (ICs) that implement the features and functions in accordance with one or more embodiments of the present invention that are discussed herein.

Figure 2:
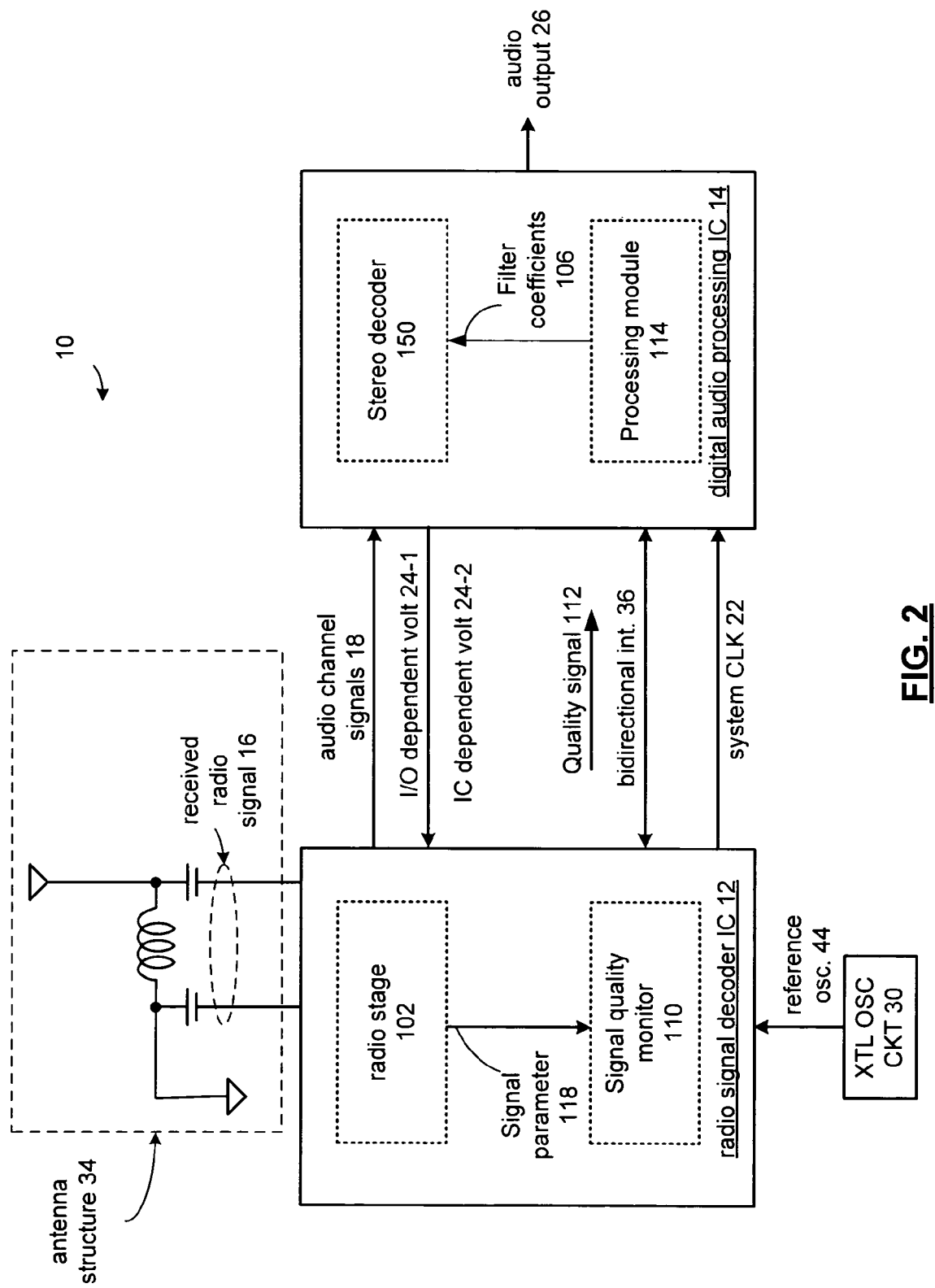
FIG. 2 presents a schematic block diagram of a handheld audio system in accordance with an embodiment of the present invention.

FIG. 2 presents a schematic block diagram of a handheld audio system in accordance with an embodiment of the present invention. In particular, a schematic block diagram of a handheld audio system 10 is presented that includes a radio signal decoder integrated circuit 12 and a digital audio processing integrated circuit 14. The digital audio processing integrated circuit 14 includes memory, and a DC-to-DC converter. The digital audio processing integrated circuit 14 further includes a processing module 114 that may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the memory stores, and the processing module executes, operational instructions corresponding to at least some of the steps and/or functions illustrated in the Figures that follow.

In this embodiment, the radio signal decoder integrated circuit 12 is operably coupled to a crystal oscillator circuit 30 and an antenna structure 34. The crystal oscillation circuit 30 is operably coupled to a crystal and produces therefrom a reference oscillation 44. The antenna structure 34 includes an antenna, a plurality of capacitors and an inductor coupled as shown. The received radio signal 16, which may be an AM radio signal, FM radio signal, satellite radio signal, cable radio signal, is provided from the antenna structure 34 to the radio signal decoder integrated circuit 12.

The radio signal decoder integrated circuit 12 includes a radio stage 102 that performs the function of radio signal decoding. Radio stage 102 converts the received radio signal 16, into two audio channel signals 18 (e.g., a digital stereo signal), which include two composite audio signals that represent a Left+Right signal and a Left−Right signal. The radio signal decoder IC 12 provides the two audio channel signals 18 to the digital audio processing IC 14. Note that the two audio channel signals 18 may be digital signals or analog signals.

In an embodiment of the present invention, the digital audio processing integrated circuit 14, via a DC-DC converter, generates an input/output (I/O) dependent supply voltage 24-1 and an integrated circuit (IC) dependent voltage 24-2 that are supplied to the radio signal decoder IC 12. In one embodiment, the I/O dependent voltage 24-1 is dependent on the supply voltage required for input/output interfacing of the radio signal decoder IC and/or the digital audio processing IC 14 (e.g., 3.3 volts) and the IC dependent voltage 24-2 is dependent on the IC process technology used to produce integrated circuits 12 and 14. In alternative embodiments, other structures and methods for supplying power to and from integrated circuits 12 and 14 may be employed within the broad scope of the present invention.

The digital audio processing integrated circuit 14 further includes a stereo decoder 150 that receives the two audio channel signals 18, digitally filters these two signals, and produces therefrom audio output 26. The digital audio processing IC 14 may provide the audio output 26 to a headphone set or other type of speaker output. As an alternative to producing the audio output 26 from the two audio channel signals 18, the digital audio processing integrated circuit 14 may process stored MP3 files, stored WMA files, and/or other stored digital audio files to produce the audio output 26.

The interface between the integrated circuits 12 and 14 further includes a bi-directional interface 36. Such an interface may be a serial interface for the integrated circuits 12 and 14 to exchange control data and/or other type of data. In one embodiment, the bi-directional interface 36 can include one or more serial communication paths.

Radio signal decoder integrated circuit 12 further includes a signal quality monitor 110 for measuring the signal quality of the received radio signal 16 and transmitting the signal quality to digital audio processing integrated circuit 14 via bidirectional interface 36. In an embodiment of the present invention, processing module 114 calculates a first corner frequency of a first digital filter and a second corner frequency of a second digital filter based on the signal quality of the received radio signal 16. In addition, processing module 114 calculates a first set of filter coefficients for the first digital filter based on the first corner frequency and an approximation of a filter transform, and stores the first set of filter coefficients in the first digital filter. Further, processing module calculates a second set of filter coefficients for the second digital filter, based on the second corner frequency and the approximation of the filter transform, and stores the second set of filter coefficients in the second digital filter.

In an embodiment of the present invention the signal quality monitor 110 measures a signal parameter 118 from the radio stage 102. In an embodiment of the present invention, the signal parameter 118 is a received signal strength indication (RSSI) signal. However, in alternative embodiments, other analog, digital and discrete-time signals that represent signal parameters can likewise be employed such as other voltages, currents, powers, an analog signal parameter proportional to the root mean square (RMS) voltage output from an RF amplifier implemented at the input of radio stage 102, an amount of adjacent channel interference, an amount of multi-path echo, and a signal to noise ratio or other parameters indicative of the signal quality in the RF amplifier, mixer or other component(s) of radio stage 102.

In an embodiment of the present invention, a quality signal 112 that represents the signal quality is transmitted over the same interface as the audio channel signals 18. In an alternative embodiment, quality signal 112 is transmitted over bidirectional interface 36. In this alternative embodiment, quality signal 112 is a digital signal, and signal quality monitor 110 includes an analog to digital (A/D) converter for converting the analog signal parameter into the quality signal 112. In another alternative embodiment of the present invention, quality signal 112 may likewise be an analog signal.

In operation, when the signal quality of received radio signal 16 decreases below one or more signal quality thresholds, the corner frequencies of the first and second digital filters of stereo decoder 150 are decreased. This provides greater noise filtration and a more pleasant auditory experience for the user.

In an embodiment of the present invention, the filter coefficients 106 of the first and second digital filters are calculated by processing module 114 and provided to stereo decoder 150 in either a realtime (or substantially realtime basis) as the signal quality decreases. Using an approximation of the filter transform to calculate the first and second filter coefficients from the calculated corner frequency reduces the computational power, speed and complexity, when compared with calculations based on a filter transformation itself.

Further functions and features of the invention will be discussed in the Figures that follow.

Figure 3:
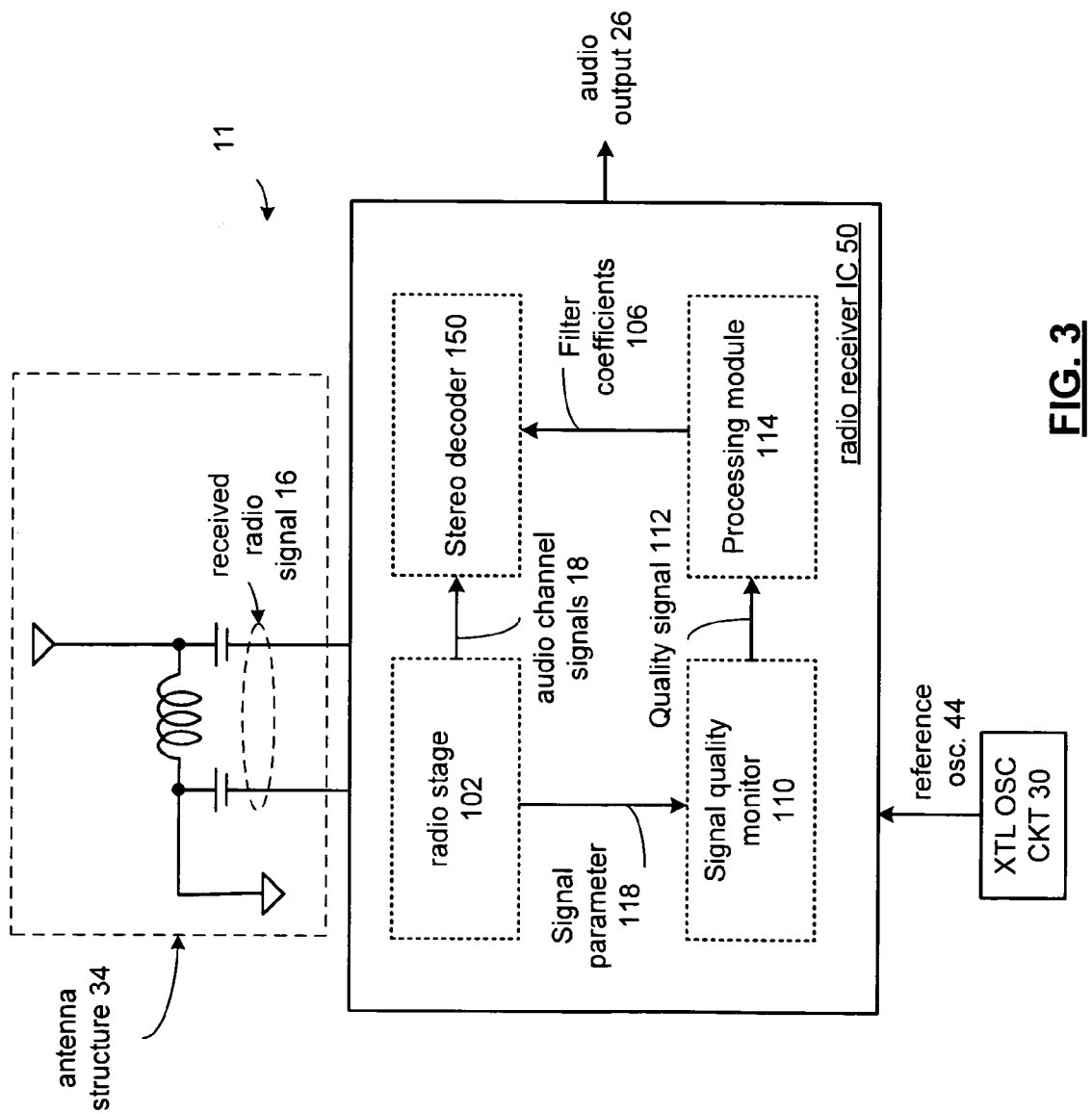
FIG. 3 presents a schematic block diagram of a handheld audio system in accordance with an alternative embodiment of the present invention.

FIG. 3 presents a schematic block diagram of a handheld audio system in accordance with an alternative embodiment of the present invention. In particular, a schematic block diagram of a handheld audio system 11 is presented that includes the functionality of handheld audio system 10 presented in a system on a chip configuration. In this embodiment, the functionality of radio signal decoder IC 12 and digital audio processing IC 14 are incorporated into a single integrated circuit, radio receiver IC 50. In particular, radio receiver IC 50 includes radio stage 102, stereo decoder 150, signal quality monitor 110 and processing module 114, and implements the full features and functionality of other embodiments of the present invention described in conjunction with FIGS. 1-17.

In addition to the configurations shown in FIG. 2 and FIG. 3, other configurations that include one or more integrated circuits are likewise possible. The broad scope of the present invention includes other partitioning of the various elements of handheld audio system 11 into one or more integrated circuits.

Figure 4:
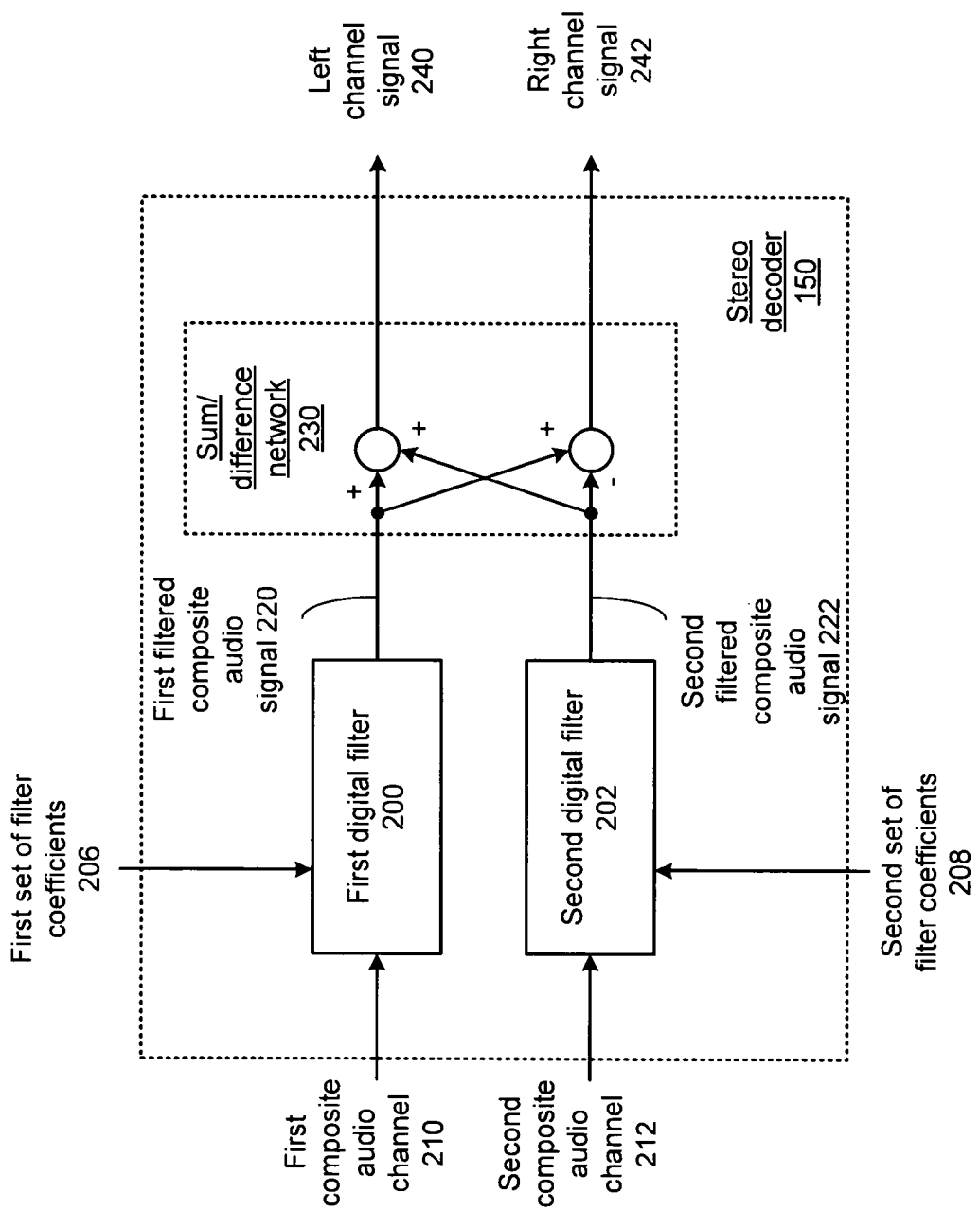
FIG. 4 presents a block diagram representation of stereo decoder 150 in accordance with an embodiment of the present invention.
Figure 7:
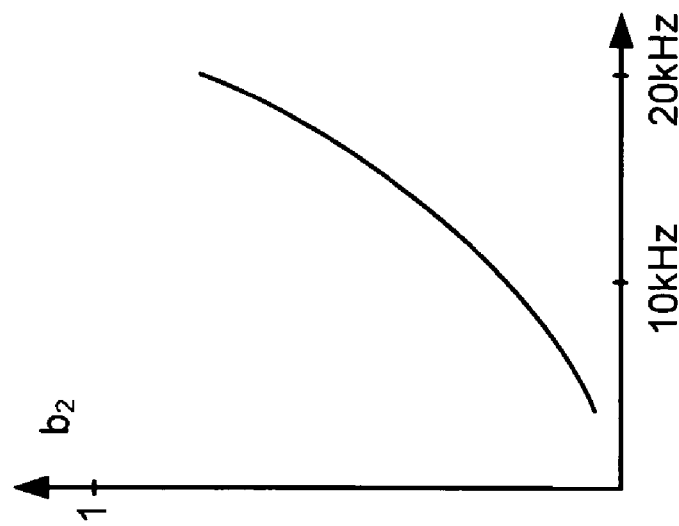
Figure 6:
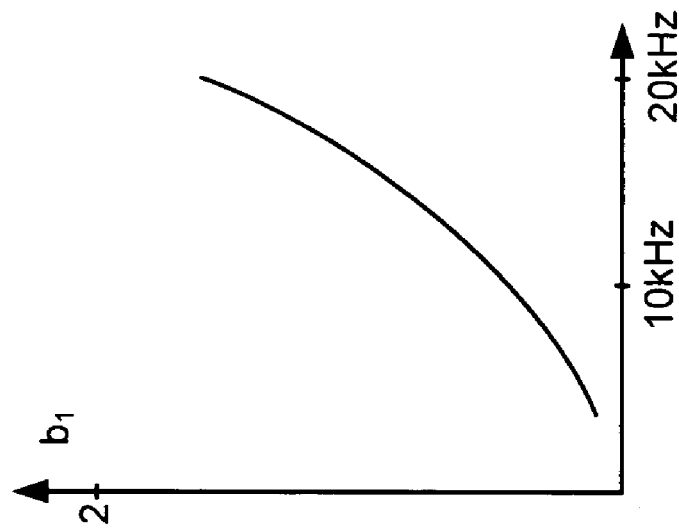
Figure 5:
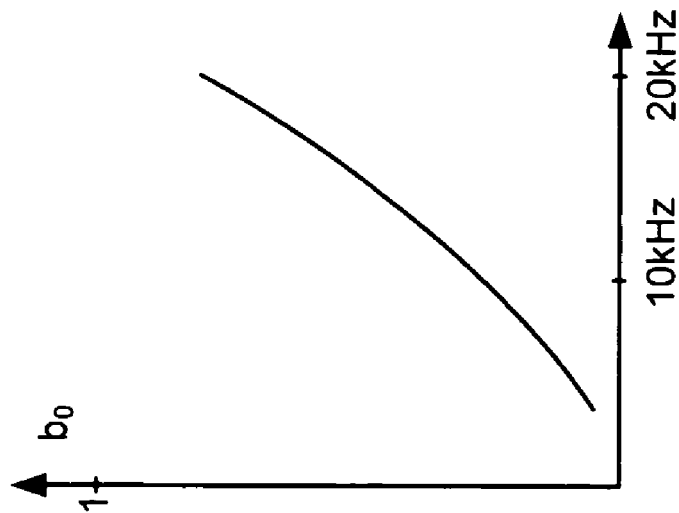

FIG. 4 presents a block diagram representation of stereo decoder 150 in accordance with an embodiment of the present invention. A first digital filter 200 produces a first filtered composite audio signal 220 in response to first composite audio channel 210. A second digital filter 202 produces a second filtered composite audio signal 222 in response to first composite audio channel 212. The first digital filter 200 has a first set of filter coefficients 206 and the second digital filter 202 has a second set of filter coefficients 208 that are calculated by processing module 114 in accordance with the present invention. In a preferred embodiment, first composite audio channel 210 is a left+right channel audio signal and second composite audio channel 212 is a left−right channel signal. A sum/difference network 230 produces a left channel signal 240 and a right channel signal 242 by adding and subtracting the first filtered composite audio signal 220 and the second filtered composite audio signal 222.

While the term "stereo" has been used to describe two related audio channels such as right channel signal 242 and a left channel signal 240, the terms "stereo", "right" and "left" channel, as used herein shall include other configurations of two or more associated audio channels including surround sound, 5.1 channel audio and others.

In an embodiment of the present invention, the first digital filter 200 and the second digital filter 202 are second order low-pass infinite impulse response (IIR) filters. The transfer function of these filters can be described in the Z-transform space as follows:

$$H(Z) = (b_0 + b_1 Z^{-1} + b_2 Z^{-2})/(a_0 + a_1 Z^{-1} + a_2 Z^{-2})$$

where the coefficients $a_0$, $a_1$, $a_2$, $b_0$, $b_1$, and $b_2$, define the frequency characteristics of the filter. While a second order digital filter is described above, filters of first order having four or fewer coefficients, or of higher orders, having five or more coefficients can likewise be used in accordance with the teachings herein.

In accordance with the present invention, the filter coefficients are calculated as follows. An ideal filter configuration is chosen for the filter. In an embodiment of the present invention, a Butterworth filter configuration can be used in implementing the first and second digital filters due to the maximally flat frequency response characteristics, however, other filters configurations including Chebyshev filter configurations, elliptic filter configurations and others can also be employed. For a given cutoff or corner frequency $f_c$, the analog transfer function $G(s)$ can easily be determined.

Next, a filter transform is chosen to convert the analog transfer function $G(s)$ into the corresponding z-transform domain transfer function $H(z)$. In an embodiment of the present invention a bilinear transform is used, however, other filter transforms including the impulse invariance transformation, forward differences transformation, and backward differences transformation, can likewise be implemented within the broad scope of the present invention.

FIGS. 5-10 present graphical representations of second order digital lowpass filter coefficients calculated as a function of corner frequency. In particular, the value of coefficients $a_0$, $a_1$, $a_2$, $b_0$, $b_1$, and $b_2$, are shown for a range of corner frequencies $f_c$ between about 400 Hz and 20 kHz, as calculated directly using a bilinear filter transform of a second order Butterworth filter. As will be recognized by one skilled in the art, the direct calculation of these coefficients can require complex mathematical functions.

In accordance with the present invention, the first set of filter coefficients 206 and the second set of digital filter coefficients are approximated, for a particular corner frequency, based on the chosen filter transform and filter configuration.

Figure 11:
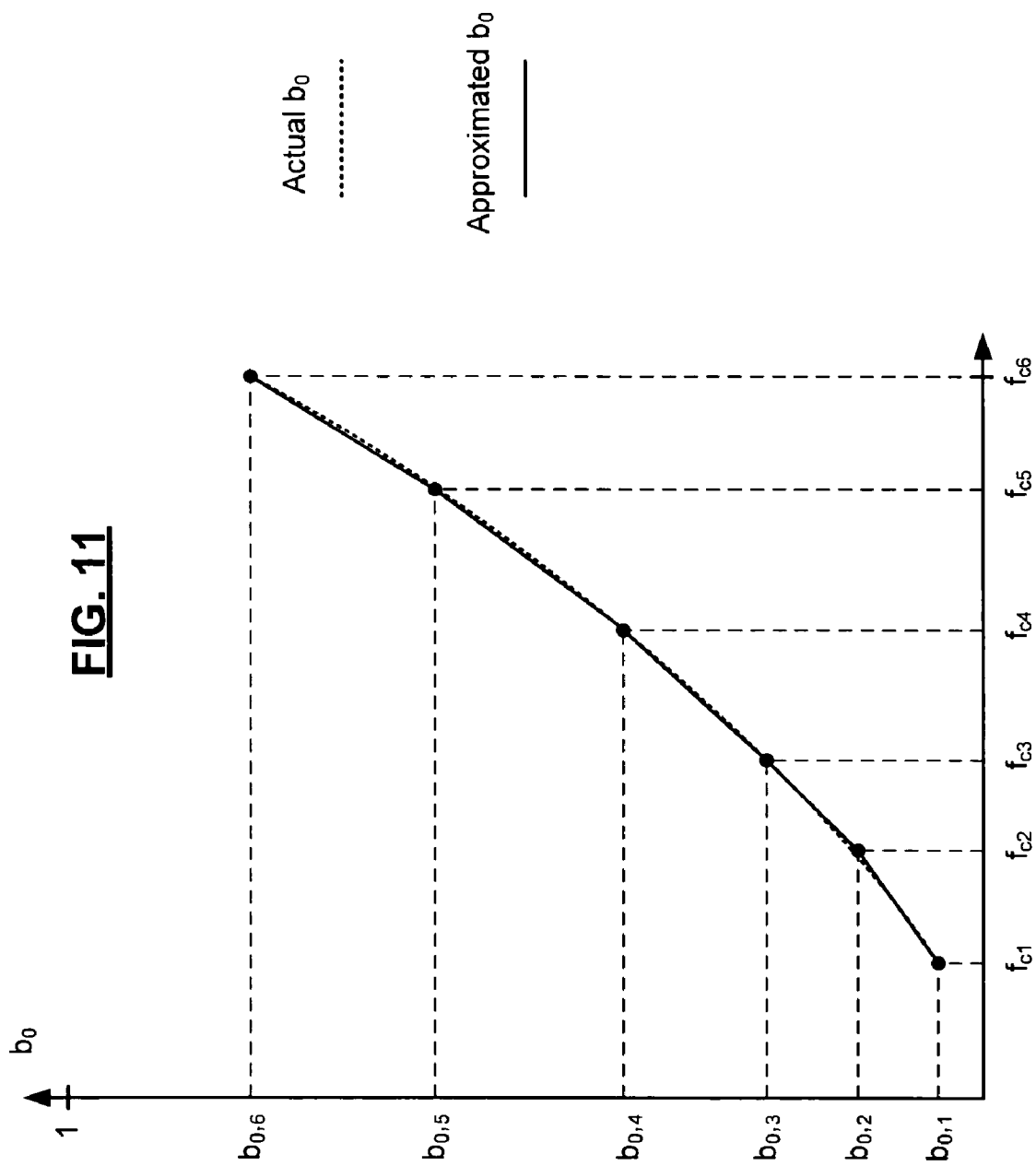
FIG. 11 presents a graphical representation of an approximation of a particular filter coefficient as a function of corner frequency.

FIG. 11 presents a graphical representation of an approximation of a particular filter coefficient as a function of corner frequency. In particular, the value of coefficient $b_0$ is calculated for six values of corner frequency, $f_c = f_{c1}, f_{c2}, f_{c3}, f_{c4}, f_{c5}$, and $f_{c6}$ using a piecewise linear interpolation. A desired approximation accuracy can be obtained in the approximation by increasing the number of linear segments used in the approximation of the coefficient. Further, the use of smaller segments in regions of greater curvature and the use of large segments in regions of lesser curvature can optimize the approximation accuracy for a particular number of segments.

While FIG. 11 shows the approximation of a single coefficient $b_0$, the other coefficients can be similarly approximated. In an embodiment of the present invention, a different number of segments can be used to approximate one or more of the coefficients. In particular, coefficients with lower curvature, such as $a_0$ and $a_1$ shown in FIGS. 8 and 9, can be approximated with as few as one or two segments. Likewise, coefficients with greater curvature, such as $a_2$ shown in FIG. 10, can be approximated with a larger number of segments.

In an embodiment of the present invention, a series of conditional instructions are used by processing module 114 to calculate at least one of the filter coefficients from either the first set of filter coefficients 206 and the second set of filter coefficients 208. Considering the example presented in conjunction with FIG. 11, the value of the coefficient $b_0$ can be calculated as a function of $f_c$ as follows:

If $f_{c6} > f_c > f_{c5}, b_0 = b_{0,5} + [(f_c - f_{c5})/(f_{c6} - f_{c5})] * (b_{0,6} - b_{0,5})$;

If $f_{c5} \geq f_c > f_{c4}, b_0 = b_{0,4} + [(f_c - f_{c4})/(f_{c5} - f_{c4})] * (b_{0,5} - b_{0,4})$;

If $f_{c4} \geq f_c > f_{c3}, b_0 = b_{0,3} + [(f_c - f_{c3})/(f_{c4} - f_{c3})] * (b_{0,4} - b_{0,3})$;

If $f_{c3} \geq f_c > f_{c2}, b_0 = b_{0,2} + [(f_c - f_{c2})/(f_{c3} - f_{c2})] * (b_{0,3} - b_{0,2})$;

If $f_{c2} \geq f_c > f_{c1}, b_0 = b_{0,1} + [(f_c - f_{c1})/(f_{c2} - f_{c1})] * (b_{0,2} - b_{0,1})$;

Considering the two boundary values of the corner frequency, simpler calculations can be implemented, If $f_c = f_{c1}, b_0 = b_{0,1}$;

If $f_c = f_{c6}, b_0 = b_{0,6}$

Each of the values $f_{ci}$ and $b_{0,i}$ used in the conditional statements above are constants that can be calculated prior to programming of processing module 114. This allows the calculation of the filter coefficient in terms of simple arithmetic functions and conditional instructions that can be readily implemented and quickly and efficiently calculated in processing module 114.

While the description and example above utilize piecewise linear interpolation to calculate an approximate value for the first set of filter coefficients 206 and the second set of filter coefficients 208, other techniques, such as cubic splines, polynomial interpolation, rational function interpolation, bicubic interpolation, and bicubic splines may likewise be used to calculate an approximate value for the first set of filter coefficients 206 and the second set of filter coefficients 208.

Figure 12:
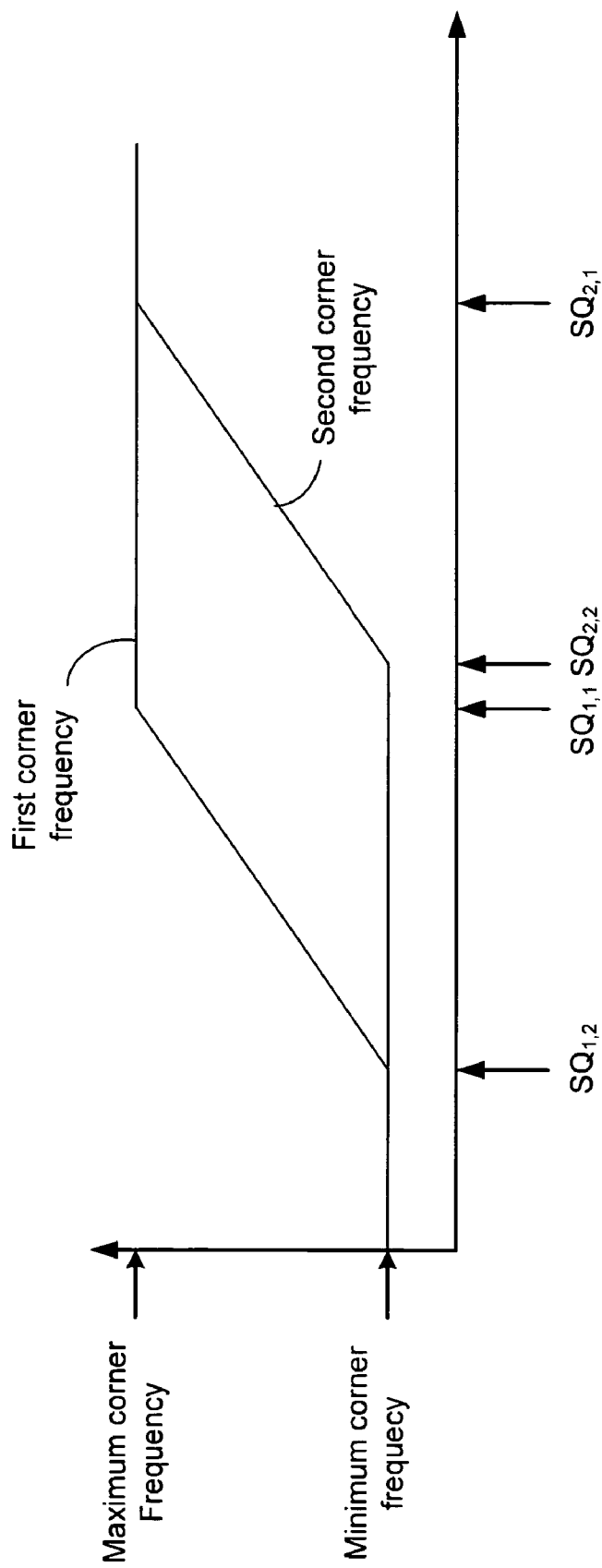
FIG. 12 presents a graphical representation of first and second corner frequencies as a function of signal quality in accordance with an embodiment of the present invention.

FIG. 12 presents a graphical representation of first and second corner frequencies as a function of signal quality in accordance with an embodiment of the present invention. In this embodiment, first digital filter, such as first digital filter 200 has a corresponding first corner frequency that is calculated differently from the second corner frequency corresponding to the second digital filter, such as second digital filter 202. In this example, the second digital filter 212 processes the second composite audio channel 212 that corresponds to a left−right channel signal, such as produced by an FM radio broadcast. A decrease in signal quality can have the effect of degrading the quality of the left−right signal before degrading the quality of the left+right (or monaural signal). In this circumstance, it is desirable to reduce the corner frequency of second digital filter 202 before reducing the corner frequency of the first digital filter 200.

When the signal quality compares favorably to a signal quality threshold $SQ_{2,1}$, both the first corner frequency and the second corner frequency can be assigned to be equal to a maximum corner frequency. As the signal quality decreases below $SQ_{2,1}$, the second corner frequency is decreased until a signal quality threshold, $SQ_{2,2}$ is reached. When the signal quality compares unfavorably to the signal quality threshold $SQ_{2,2}$, the second corner frequency is assigned to be equal to a minimum corner frequency. When the signal quality compares favorably to the signal quality threshold $SQ_{2,2}$ and unfavorably to a signal quality threshold and $SQ_{2,1}$, the second corner frequency is calculated based on a function such as a monotonic function. While the monotonic function shown in FIG. 12 is a linear function, other monotonic functions can likewise be implemented within the broad scope of the present invention.

As the signal quality decreases below $SQ_{1,1}$, the first corner frequency is decreased until a signal quality threshold, $SQ_{1,2}$ is reached. When the signal quality compares unfavorably to the signal quality threshold $SQ_{1,2}$ the first corner frequency is assigned to be equal to a minimum corner frequency. When the signal quality compares favorably to the signal quality threshold $SQ_{1,2}$ and unfavorably to a signal quality threshold and $SQ_{1,1}$, the first corner frequency is calculated based on a function such as a monotonic function. While the monotonic function shown in FIG. 15 is a linear function, other monotonic functions can likewise be implemented within the broad scope of the present invention.

Figure 14:
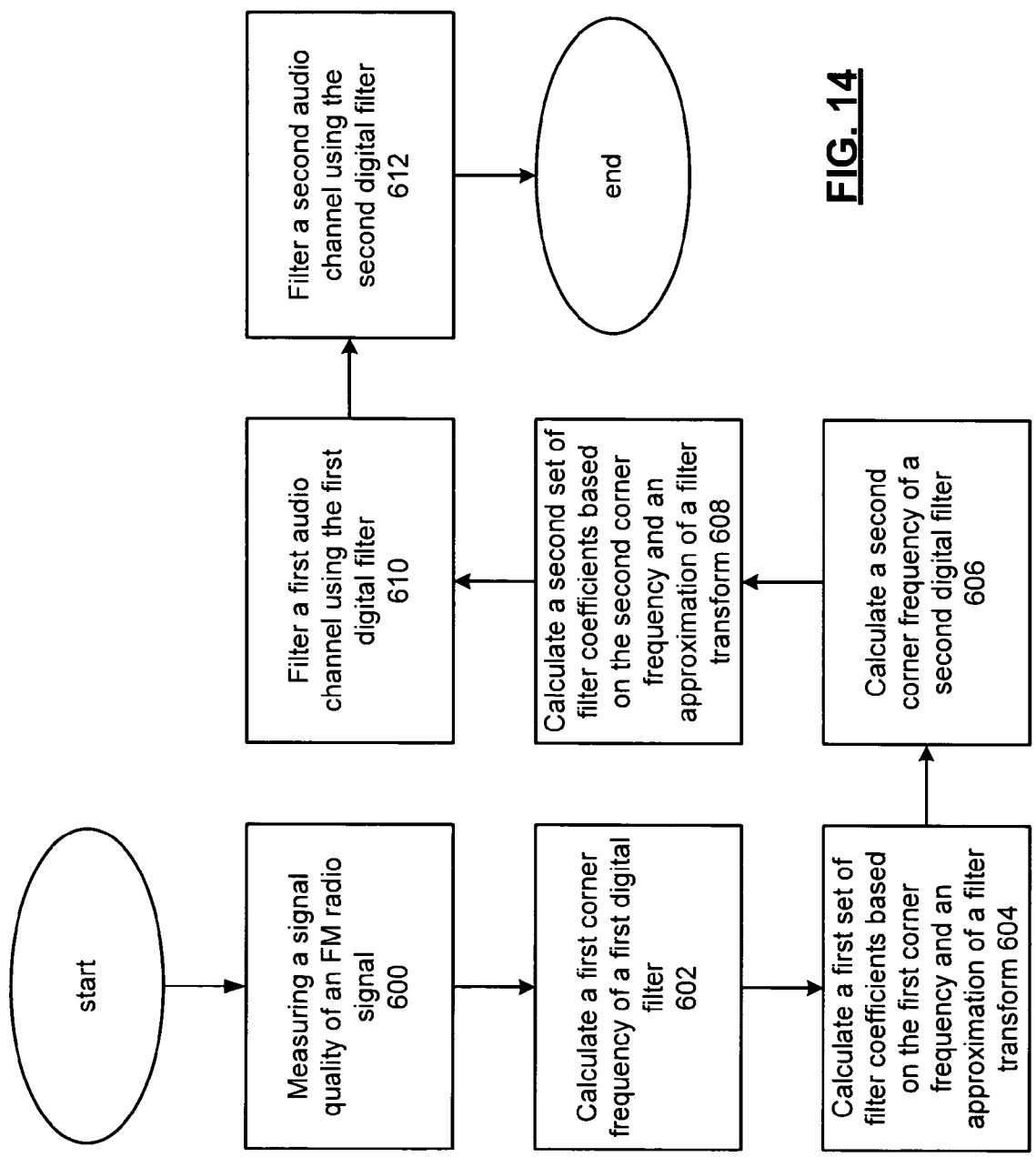
FIG. 14 presents a flowchart representation of a method in accordance with an embodiment of the present invention.

In an embodiment of the present invention, the maximum corner frequency can be chosen as a high audio frequency such as a frequency in the range of 12 kHz-24 kHz to pass all the frequencies present in the audio signals. Further, the minimum corner frequency can be chosen to be a low audio frequency such as a frequency in the range of 300 Hz-750 Hz that allows some intelligibility of the audio content while greatly reducing the amount of noise that is passed. While the embodiment of FIG. 14 shows the first and second corner frequencies to have the same maximum and minimum, different maximums and minimums may likewise be implemented. Further while $SQ_{1,1} < SQ_{2,2}$ is shown in FIG. 12, other thresholds where $SQ_{1,1} \geq SQ_{2,2}$ can likewise be implemented.

Figure 13:
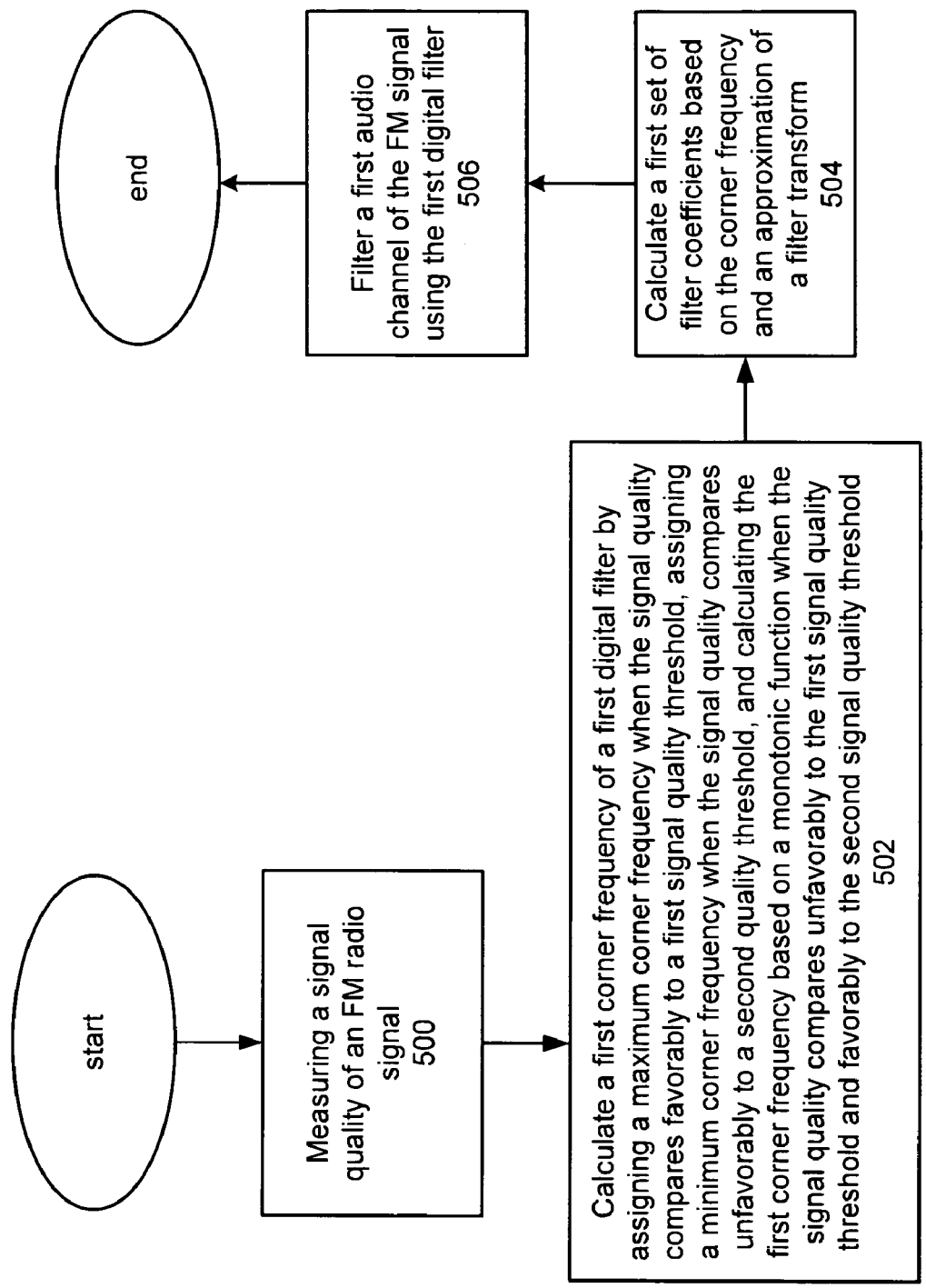
FIG. 13 presents a flowchart representation of a method in accordance with an embodiment of the present invention.

FIG. 13 presents a flowchart representation of a method in accordance with an embodiment of the present invention. In particular, a method is presented that can be optionally used in conjunction with the features and functions discussed in conjunction with FIGS. 1-12. The method begins in step 500 by measuring a signal quality of the FM radio signal. In step 502, the method continues by calculating a first corner frequency of a first digital filter based on the signal quality by assigning a maximum corner frequency when the signal quality compares favorably to a first signal quality threshold, assigning a minimum corner frequency when the signal quality compares unfavorably to a second signal quality threshold, and calculating the first corner frequency based on a monotonic function when the signal quality compares unfavorably to a first signal quality threshold and when the signal quality compares favorably to a second signal quality threshold. In step 504, the method calculates a first set of filter coefficients for the first digital filter, based on the first corner frequency and an approximation of a desired filter transform. In step 506, the method filters a first audio channel of the FM signal using the first digital filter.

FIG. 14 presents a flowchart representation of a method in accordance with an embodiment of the present invention. In particular, a method is presented that can be optionally used in conjunction with the features and functions discussed in conjunction with FIGS. 1-12. The method begins in step 600 by measuring a signal quality of the radio signal. In step 602, a first corner frequency of a first digital filter is calculated based on the signal quality. In step 604, a first set of filter coefficients for the first digital filter are calculated based on the first corner frequency and an approximation of a filter transform. In step 606, a second corner frequency of a second digital filter is calculated based on the signal quality. In step 608, a second set of filter coefficients for the second digital filter are calculated based on the second corner frequency and the approximation of the filter transform. The method continues in step 610 by filtering a first audio channel of the radio signal using the first digital filter. In step 612, the second audio channel of the radio signal is filtered using the second digital filter.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

In preferred embodiments, the various circuit components are implemented using 0.35 micron or smaller CMOS technology. Provided however that other circuit technologies, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a stereo decoder, radio receiver and handheld audio system. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A stereo decoding system for use in a radio receiver that receives a radio signal, comprising:
    a first digital filter, operably coupled to a first composite audio channel for producing a first filtered composite audio signal, the first digital filter having a first set of filter coefficients;
    a second digital filter, operably coupled to a second composite audio channel for producing a second filtered composite audio signal, the second digital filter having a second set of filter coefficients;
    a sum/difference network, operably coupled to the first filtered composite audio signal and the second filtered composite audio signal for producing a left channel signal and a right channel signal;
    a processor, operably coupled to the first digital filter and the second digital filter for executing operational instructions that:
        calculate a first corner frequency of the first digital filter based on a signal quality of the received radio signal;
        calculate a first set of filter coefficients for the first digital filter based on the first corner frequency and an approximation of a filter transform, and store the first set of filter coefficients in the first digital filter;
        calculate a second corner frequency of the second digital filter based on the signal quality; and
        calculate a second set of filter coefficients for the second digital filter, based on the second corner frequency and the approximation of the filter transform, and store the second set of filter coefficients in the second digital filter.

2. The stereo decoding system of claim 1 wherein the filter transform includes at least one of: a bilinear transformation, an impulse invariance transformation, a forward differences transformation, and a backward differences transformation.

3. The stereo decoding system of claim 1 wherein the approximation includes at least one of: a piecewise linear interpolation, a cubic spline, a polynomial interpolation, a rational function interpolation, a bicubic interpolation, and a bicubic spline.

4. The stereo decoding system of claim 1 wherein the first digital filter approximates one of: a Butterworth filter, a Chebyshev filter, and an elliptic filter.

5. The stereo decoding system of claim 1 wherein the first digital filter has an order that is two or more.

6. The stereo decoding system of claim 1 wherein the signal quality includes at least one of: a received signal strength indication, an amount of adjacent channel interference, an amount of multi-path echo, and a signal to noise ratio.

7. The stereo decoding system of claim 1 wherein the first audio channel includes a first stereo composite signal and the second audio channel includes a second stereo composite signal.

8. The stereo decoding system of claim 1 wherein the processor performs operational instructions to calculate a first corner frequency by assigning a maximum corner frequency when the signal quality compares favorably to a first signal quality threshold.

9. The stereo decoding system of claim 8 wherein the processor performs operational instructions to calculate a second corner frequency by assigning the maximum corner frequency when the signal quality compares favorably to a second signal quality threshold, wherein the first signal quality threshold is not equal to the second signal quality threshold.

10. The stereo decoding system of claim 1 wherein the processor performs operational instructions to calculate a first corner frequency by assigning a minimum corner frequency when the signal quality compares unfavorably to a third signal quality threshold.

11. The stereo decoding system of claim 10 wherein the processor performs operational instructions to calculate a second corner frequency by assigning the minimum corner frequency when the signal quality compares favorably to a fourth signal quality threshold, wherein the third signal quality threshold is not equal to the fourth signal quality threshold.

12. The stereo decoding system of claim 1 wherein the processor performs operational instructions to calculate a first corner frequency based on a monotonic function when the signal quality compares unfavorably to a first signal quality threshold and when the signal quality compares favorably to a second signal quality threshold.

13. The stereo decoder of claim 12 wherein the monotonic function is a linear function.

14. The stereo decoding system of claim 1 wherein at least one of: the processor, the first filter and the second filter, are included in a system on a chip integrated circuit.

15. The stereo decoding system of claim 1 wherein the processor is operable to calculate the first set of filter coefficients substantially in realtime.

16. A method for use in a radio receiver for receiving a radio signal, the method comprising:
    measuring a signal quality of the radio signal;
    calculating a first corner frequency of a first digital filter based on the signal quality;
    calculating a first set of filter coefficients for the first digital filter based on the first corner frequency and an approximation of a filter transform;
    calculating a second corner frequency of a second digital filter based on the signal quality;
    calculating a second set of filter coefficients for the second digital filter, based on the second corner frequency and the approximation of the filter transform;
    filtering a first audio channel of the radio signal using the first digital filter; and
    filtering the second audio channel of the radio signal using the second digital filter.

17. The method of claim 16 wherein the filter transform includes at least one of: a bilinear transformation, an impulse invariance transformation, a forward differences transformation, and a backward differences transformation.

18. The method of claim 16 wherein the approximation includes at least one of: a piecewise linear interpolation, a cubic spline, a polynomial interpolation, a rational function interpolation, a bicubic interpolation, and a bicubic spline.

19. The method of claim 16 wherein the first digital filter approximates one of: a Butterworth filter, a Chebyshev filter, and an elliptic filter.

20. The method of claim 16 wherein the first set of coefficients includes five or more coefficients.

21. The method of claim 16 wherein the step of measuring the signal quality includes measuring at least one of: a received signal strength indication, an amount of adjacent channel interference, an amount of multi-path echo, and a signal to noise ratio.

22. The method of claim 16 wherein the first audio channel includes a first stereo composite signal and the second audio channel includes a second stereo composite signal.

23. The method of claim 16 wherein the step of calculating a first corner frequency includes assigning a maximum corner frequency when the signal quality compares favorably to a first signal quality threshold.

24. The method of claim 23 wherein the step of calculating a second corner frequency includes assigning the maximum corner frequency when the signal quality compares favorably to a second signal quality threshold, wherein the first signal quality threshold is not equal to the second signal quality threshold.

25. The method of claim 16 wherein the step of calculating a first corner frequency includes assigning a minimum corner frequency when the signal quality compares unfavorably to a third signal quality threshold.

26. The method of claim 25 wherein the step of calculating a second corner frequency includes assigning the minimum corner frequency when the signal quality compares favorably to a fourth signal quality threshold, wherein the third signal quality threshold is not equal to the fourth signal quality threshold.

27. The method of claim 16 wherein the step of calculating a first corner frequency includes calculating the first corner frequency based on a monotonic function when the signal quality compares unfavorably to a first signal quality threshold and when the signal quality compares favorably to a second signal quality threshold.

28. The method of claim 27 wherein the monotonic function is a linear function.

29. The method of claim 16 wherein the step of calculating the first set of filter coefficients is performed substantially in realtime in response to a change in signal quality.

30. A method for use in a frequency modulation (FM) receiver for receiving an FM radio signal, the method comprising:
    measuring a signal quality of the FM radio signal;
    calculating a first corner frequency of a first digital filter based on the signal quality by assigning a maximum corner frequency when the signal quality compares favorably to a first signal quality threshold, assigning a minimum corner frequency when the signal quality compares unfavorably to a second signal quality threshold, and calculating the first corner frequency based on a monotonic function when the signal quality compares unfavorably to a first signal quality threshold and when the signal quality compares favorably to a second signal quality threshold;
    calculating a first set of filter coefficients for the first digital filter, based on the first corner frequency and an approximation of a desired filter transform; and
    filtering a first audio channel of the FM signal using the first digital filter.

31. The method of claim 30 wherein the filter transform includes at least one of: a bilinear transformation, an impulse invariance transformation, a forward differences transformation, and a backward differences transformation.

32. The method of claim 30 wherein the approximation includes at least one of: a piecewise linear interpolation, a cubic spline, a polynomial interpolation, a rational function interpolation, a bicubic interpolation, and a bicubic spline.

33. The method of claim 30 wherein the first digital filter approximates one of: a Butterworth filter, a Chebyshev filter, and an elliptic filter.

34. The method of claim 30 wherein the first set of coefficients includes five or more coefficients.

35. The method of claim 30 wherein the step of measuring the signal quality includes measuring at least one of: a received signal strength indication, an amount of adjacent channel interference, an amount of multi-path echo, and a signal to noise ratio.

36. The method of claim 30 wherein the first audio channel includes a first stereo composite signal and the second audio channel includes a second stereo composite signal.

37. The method of claim 30 wherein the monotonic function is a linear function.

38. The method of claim 30 wherein the step of calculating the first set of filter coefficients is performed substantially in realtime in response to a change in signal quality.

* * * * *